United States Patent Office 2,906,722
Patented Sept. 29, 1959

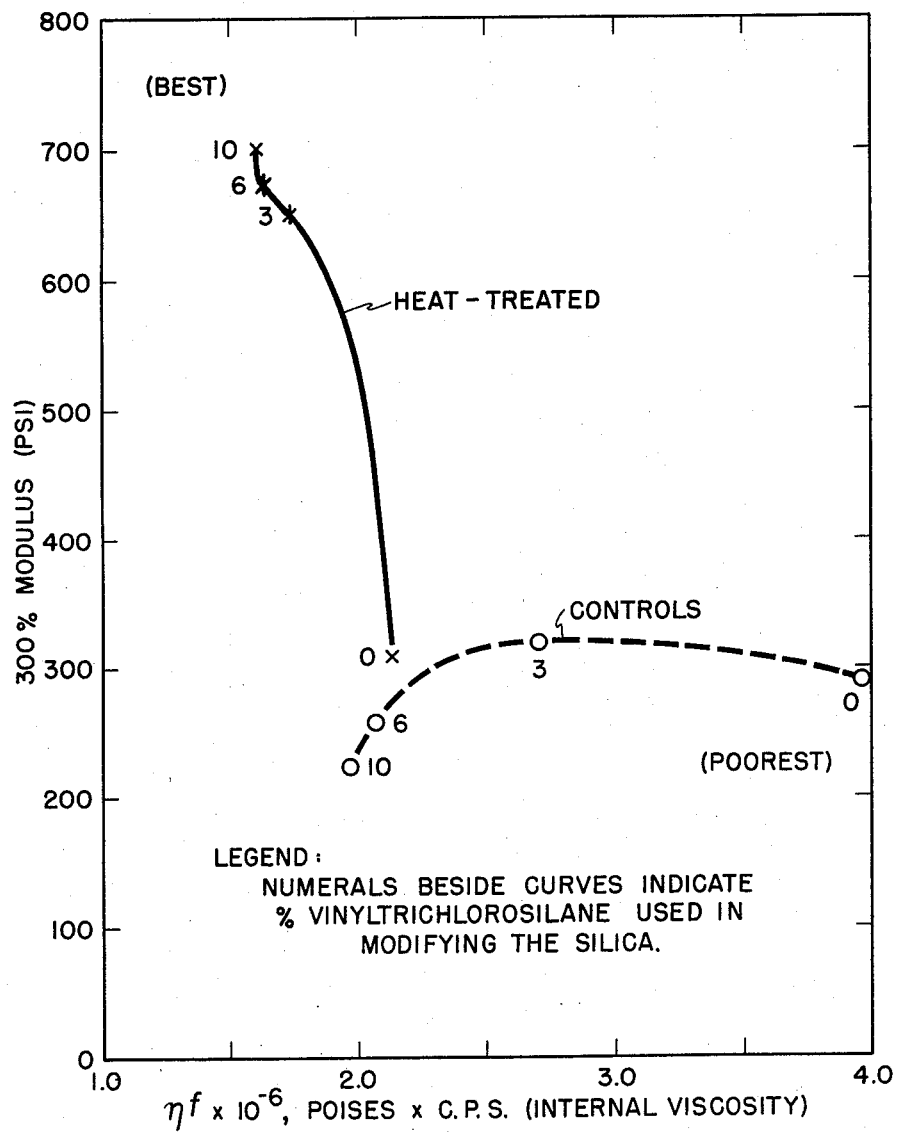

2,906,722

HEAT-TREATED COMPOSITIONS OF BUTYL RUBBER AND ALKENYLHALOSILANE-MODIFIED SILICA AND PROCESS OF PREPARATION

Albert M. Gessler and Herbert K. Wiese, Cranford, and John Rehner, Jr., Westfield, N.J., assignors to Esso Research and Engineering Company, a corporation of Delaware Application December 19, 1955, Serial No. 553,927

14 Claims. (Cl. 260—41.5)

This invention relates to a novel method of making Butyl rubber compositions containing modified mineral pigments, and more particularly it relates to modifying pigments such as hydrated silica with alkenylhalosilane, mixing the resulting modified pigment with Butyl rubber subjecting the mixture to heat-treatment, then cooling, adding curing agents, shaping and finally vulcanizing the composition, as in the manufacture of auto tires and numerous other products.

In the past it has been common practice to reinforce natural rubber and synthetic rubbers with carbon black to obtain rubber compositions having improved properties, e.g. higher strength and elasticity characteristics for use in auto tires, etc. Attempts have been made to use the various commercially available mineral pigments such as finely divided silicas, clays, whiting, etc., but such materials have had only limited success and normally have not proved to have any reinforcing properties in Butyl rubber, a synthetic rubber having a low chemical unsaturation corresponding to an iodine number of about 0.5 to 50. Attempts have been made to chemically modify the surface of the mineral pigments such as hydrated silicas, aluminas, etc., in an effort to obtain modified pigments which will have reinforcing properties specifically when compounded with Butyl rubber. Patent No. 2,665,264 reports a partial success along this line by the use of certain materials such as cyclohexenyl trichlorosilane as the pigment modifying agent. However, poor results were obtained with other organohalosilanes in which the organo groups were alkyl, aryl or alkenyl groups.

It has now been found that quite unexpectedly a silica modified by an alkenylhalosilane such as vinyl trichlorosilane does not give reinforcing properties in Butyl rubber when mixed by conventional methods and cured, such modified pigments do give every effective reinforcement in Butyl rubber when the compositions are subjected to a heat-treatment prior to the addition of the curing agents, and then subsequently cooled, mixed with curing agents, shaped and vulcanized. Thus, this heat-treatment is the factor which makes the vinyl trichlorosilane-modified silica effective for reinforcing the butyl rubber and improving the tensile strength, modulus and elasticity characteristics of the compositions. The improvement in elasticity properties is evidenced by a lowering of the internal viscosity and a reduction of the damping characteristics when the vulcanized compositions are subjected to alternate stretching and relaxation. The heat-treatment results in a thermal interaction betweeen the modified pigment and the Butyl rubber molecules, and results in modified-silica butyl bonds.

An improved modification of the invention comprises carrying out the heat-treatment in the presence of a heat-interaction promoter, such as p-quinonedioxime or other materials as will be discussed further hereinbelow.

The organohalosilane to be used according to the present invention should be an alkenylhalosilane having the general formula $$R_mSi_nX_{2n+2-m}$$

where at least one R is a straight or branched alkenyl group such as vinyl, allyl, butenyl, hexenyl, octadecenyl, etc. having generally from 2 to 20 carbon atoms, preferably having 2 to 12 carbon atoms, $m=1$ to $2n+1$, and X is a halogen having an atomic weight at least as high as that of chlorine, and $n=1$ to 5 or somewhat higher. Other R groups may be alkyl, aryl or cycloalkyl groups. The preferred organo halosilane to be used is one having the general formula $$R_mSiX_{4-m}$$

where $m=1$ to 3, as in the formulae $RSiCl_3$, or $R_2SiCl_2$, $R_3SiCl$, or mixtures thereof. A preferred species of the halosilane modifying agents is vinyl trichlorosilane. Other examples are

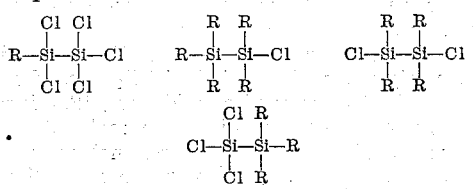

The modification of the hydrated silica or other mineral pigment with such alkenylhalosilanes may be carried out in known manner. One convenient method is to dissolve the alkenylhalosilane in a suitable inert solvent such as a paraffin having about 5 to 20 carbon atoms, preferably 6 to 10, and then mixing the resulting solution in desired proportion with the mineral pigment to be modified. Generally the reaction takes place at room temperature, although heat may be applied if desired or necessary. After reaction has been completed, generally in about 1 to 5 hours, the solvent may be evaporated and the modified pigment recovered and dried.

The proportions of pigment and alkenylhalosilane to be used may vary depending upon which individual members of these two classes of materials are used, and to some extent upon the relative degree of unsaturation of the Butyl rubber with which the resulting modified pigment is to be compounded. However, normally about 0.1 to 15%, preferably about 1 to 10%, of alkenylhalosilane should be used based on 100 parts by weight of the mineral pigment.

The pigments or mineral fillers to be used according to the present invention may be selected from a wide group of inorganic mineral materials, preferably at least partially hydrated silicas, aluminas, calcium silicates, clays, etc. These materials may be natural mineral substances or synthetic products or by-products of industry, and may, if desired, be subjected to various physical or chemical purification or refining treatments, or activation, e.g. by partial dehydration, and may be subjected to comminution or pulverizing in any known manner to obtain fillers of the desired fineness.

These mineral substances may consist of or contain single or complex metal oxides or hydroxides, or partially hydrated metal or metalloid oxides. Some of the various mineral fillers which may be used include the following:

Aluminum silicate
Hydrous alumina silicate
Precipitated calcium carbonate
Basic alumina sulfate
Aluminum hydroxide, bauxite
Kaolin
Magnesium carbonate
Precipitated magnesium carbonate
Various clays (various $SiO_2$—$Al_2O_3$ ratios)
Precipitated hydrated calcium silicate
Titanium dioxide
Hydrated silica These various mineral fillers should be finely divided powders, 99% passing a 325 mesh screen, down to as fine as 0.01–0.02 microns particle size.

The mineral fillers, after having been modified by an alkenylhalosilane, as previously described hereinabove, are then to be compounded with Butyl rubber for use according to this invention.

Butyl rubber, as the term is used in the art and in the present specification and claims, is a synthetic high molecular rubbery copolymer of about 0.1 to 15% by weight of a multiolefin of 4 to 14, preferably 4 to 6 or 8 carbon atoms, with a mono-olefin of 4 to 8 carbon atoms, preferably an iso-olefin of 4 to 5 carbon atoms. These rubbery copolymers may be made as described in U.S. Patent 2,356,128, and in the book by Whitby on "Synthetic Rubber" (1954), chapter 24, namely by copolymerization at temperatures below 0° C., preferably between about −50° C. and −165° C., preferably in the presence of about 1 to 20 volumes of inert diluent such as methyl-, or ethyl chloride, butane, heptane, etc., and in the presence of a small amount of dissolved Friedel-Crafts catalyst, e.g. $AlCl_3$, $BF_3$, $TiCl_4$, etc., dissolved in methyl chloride or ethyl chloride, or $AlBr_3$ dissolved in heptane, etc. The resulting high molecular weight copolymer should have a Staudinger molecular weight of about 20,000 to 100,000 or more, corresponding to a viscosity average molecular weight of about 130,000 to 2,000,000, and should have a Mooney value (8 minutes at 212° F.) of about 30 to 90, preferably about 40 to 70, with a relatively low mole percent unsaturation of about 0.1 to 15%, or an iodine number (Wijs) of about 0.5 to 50. These copolymers, which have been manufactured commercially for a number of years under the Government designation GRI, are vulcanizable and may be cured with either some sulfur and older accelerators such as tetramethyl thiuram disulfide, mercaptobenzoyl thiazole, etc., or with non-sulfur curing agents such as paranitrosobenzene, paraquinonedioxime, or its derivatives, etc.

The above described Butyl rubber is very different in many respects from natural rubber which has an iodine number of about 350, and various high unsaturation synthetic rubbers such as GRS (butadiene-styrene emulsion copolymer), butadiene-acrylonitrile synthetic rubber, polychloroprene, and others which have iodine numbers ranging from about 200 to 350. All of these materials behave differently than Butyl rubber if any compounding and curing with various fillers and curing agents. Thus, although vinyltrichlorosilane-modified silica does have some reinforcing effect when compounded with some of the above mentioned high unsaturation rubbers, it does not have such effect when compounded with Butyl rubber with ordinary conventional compounding and curing practice. However, according to this invention, if the vinyl- or other alkenylhalosilane-modified pigment is compounded with Butyl rubber and the mixture is subjected to heat-treatment, in the absence of curing amounts of vulcanizing agents, either accompanied or followed by thorough mastication, then cooled, mixed with conventional curing agents, shaped and vulcanized, the resulting products are found to have been very surprisingly improved in tensile strength, modulus, elasticity and other reinforcing characteristics.

The proportions of the modified pigment and Butyl rubber to be used will, of course, vary according to the intended application of the finished composition, but will normally be within the range of about 1 to 150, preferably about 10 to 100, parts by weight of modified pigment per 100 parts by weight of Butyl rubber. This mixture may be made by any conventional mixing method, e.g. on a regular rubber mill or in a Banbury mixer, etc.

The heat-treatment to be applied, according to the present invention, to the mixture of modified pigment and Butyl rubber may be carried out in several ways, namely by hot milling, which is the preferred method, or by static heating followed by mastication, or by alternate cycles of static heating, e.g. for 15 minutes to an hour followed by a few minutes, e.g. 1 to 10 minutes, preferably about 3 to 5 minutes of milling or mastication. Such cycles may be repeated as often as desired, e.g. 5 to 20 times, preferably about 6 to 10 or 12 times.

The temperature to be used may vary according to the type of heat-treatment being used and, of course, according to the duration of heat-treatment. Generally, the temperature of the heat-treatment should be from 250° to 450° F., preferably from 300° to 380° F., for a period of time ranging inversely according to the temperature, from about one hour to eight hours at 250° F. with static heating, to as short a time as 5 to 30 minutes at 350–450° F. with hot milling, Banburying or other dynamic heating. Intermediate combinations of temperature time and amount of mastication or working may be used. In general, the time of heating (in hours) may be expressed by the formula $$\text{Hours} = \frac{K}{T-200}$$

where T is the temperature in ° F., and K is 15 to 600, preferably 40 to 550. Preferably, for static heating, K should be 200–550, and for dynamic heating, about 15 to 150.

As another modification of the invention, particularly preferred for reducing the duration of heat-treatment, one may use a small amount of heat-interaction promoter, such as about 0.05 to 10%, preferably 0.1–5%, of paraquinonedioxime or its ester or other derivatives, e.g. paraquinonedioxime dibenzoate. Other suitable promoters include other compounds having a quinonoid aromatic nucleus structure, e.g.: $Ar(NO)_2$ wherein Ar is a 1,4-arylene radical or substitution product thereof. Thus there are included such typical compounds as p-dinitroso benzene, p-dinitroso toluene, p-dinitroso xylene, p-dinitroso cymene, 1,4-dinitroso naphthalene, etc. or similar derivatives in which side chains, etc. are introduced on the arylene nucleus for the purpose of conferring modified properties, greater solubilities, etc.

The meta dinitroso aromatic compounds are similarly usable and they are substantially as satisfactory as the para compounds; substantially any para-dinitroso or metadinitroso aromatic compound may be used.

Certain compounds containing an ortho- or paraquinonoid nucleus of the benzene or naphthalene series or compounds capable of forming an ortho- or para-quinonoid nucleus of the benzene or naphthalene series in the presence of an oxidizing agent can also be used. One such class is the quinone imines, or more particularly, the quinone di-imines. One example of this type of compound is p-quinone dioxime.

Esters of such compounds may be used, e.g. p-quinonedioxime dibenzoate. In case a heat interaction promoter is used, the duration of heat-treatment may be reduced generally to about 20 to 50% of the time otherwise recommended above in the absence of such interaction promoter.

Regardless of how the heat-treatment of the Butyl rubber and mineral filler mixture is carried out, i.e., statically or with hot milling or other mastication, the heat-treatment should end up with a final mastication or mixing in order to insure that the mixture is homogeneous and in a smooth workable plastic condition. The mixture should then be cooled or permitted to cool to a temperature below 250° F. in order to avoid scorching when the curing agents are added, then the desired curing agents are incorporated with mixing at a relatively moderate temperature, e.g. about 100 to about 250° F., preferably 100–150° F.

The usual curing agents for Butyl rubber may be used, including about 0.5 to 3, preferably 1 to 2, parts of sulfur per 100 parts of rubber. About 0.5 to 2 parts per 100 of accelerators may be used such as Tuads (tetramethyl thiuram disulfide), Captax (2-mercaptobenzothiazole), Altax (benzothiazyl disulfide), bis-4-ethyl thiazyl disulfide, diphenyl guanidine, butyraldehyde-aniline products, zinc dimethyl dithiocarbamate, or other thiurams, dithiocarbamates, thiazole guanidines, aldehyde-amines, etc.

Instead of, or in addition to, the above sulfur and accelerator, one may use non-sulfur curing agents such as p-dinitrosobenzene, p-quinone dioxime, or thiuram tetrasulfides, etc.

Other conventional compounds agents may be incorporated into the mixture prior to curing, e.g. antioxidants or other stabilizers, stearic acid (about 1 to 2 p.p.h.), zinc oxide (about 1 to 25 p.p.h.), any desired colored pigments or dyes, and if desired either small amounts (e.g. 1 to 10 p.p.h.) of waxes, resins or oils as processing aids, or even larger amounts (about 10 to 50 p.p.h.) of non-volatile mineral oils or esters, etc. as extenders.

After the desired curing agents and other compounding agents have been incorporated, the composition is finally shaped as desired, e.g. by sheeting, extruding or moulding into any desired form, and finally vulcanized, e.g. by heating to a moderately low curing temperature of about 250 to 270° F. for about 240 to 60 minutes, or to a relatively high curing temperature of about 350° F. to 400° F. for about 5 to 0.5 minutes, or appropriate intermediate temperature and time.

It is also possible to use the compositions of this invention in the form of cements, i.e. as dispersions of the promoted heat-treated mixture of Butyl rubber and mineral fillers in a concentration of about 5 to 40% by weight in a volatile solvent such as a petroleum naphtha, alone or with curing agents.

The details and advantages of the invention will be better understood from a consideration of the following experimental data.

EXAMPLE I

Compounds of Butyl with standard and surface treated Hi-Sil C were prepared using GR–I–17 which is an isobutylene-isoprene Butyl rubber having a mole percent unsaturation of about 1.5 to 1.9, and a Mooney value (8 min. at 212° F.) of about 60 to 70. The following formulation was used:

FORMULATION OF COMPOUND

| | | |
|---|---|---|
| GR–I–17 | 100.0 | Masterbatch. |
| Filler | 40.0 | |
| BxDC[1] | 2.0 | |
| Zinc oxide | 5.0 | Vulcanizing Agents. |
| Sulfur | 2.0 | |
| Tellurac[2] | 1.0 | |
| B.J.F.[3] | 1.0 | |

[1] Butoxyethyl diglycol carbonate.
[2] Tellurium diethyl dithiocarbamate.
[3] 3-anilinomethyl-2 (3) benzothiazolethione.

Half of the masterbatch was set aside without further treatment. The other half was hot milled for 30 minutes at 310° F. Vulcanizing agents were added finally on a cool mill and the compounds were cured for 60 minutes at 307° F.

Hi-Sil C was surface treated with vinyl trichlorosilane. Varying amounts of the silane were dissolved in 2 liter portions of n-hexane and these solutions were poured over 200 gram lots of the pigment. The latter were stirred for 2 to 3 hours, after which the solvent was allowed to evaporate off at room temperature.

Table I gives the physical properties of Butyl vulcanizates prepared with the resulting fillers. A control in each series shows the properties which are obtained with standard Hi-Sil C. Data are presented for all of the compositions, both before and after heat-treatment.

Table I.—*Physical properties of compounds with vinyl trichlorosilane modified Hi-Sil C, before and after heat treatment*

(CONTROLS) NOT HEAT-TREATED

| Test No | 1 | 2 | 3 | 4 |
|---|---|---|---|---|
| Weight percent vinyltrichlorosilane | 0 | 3 | 6 | 10 |
| Modulus at, lbs./in.$^2$: | | | | |
| 100% | 165 | 150 | 120 | 100 |
| 200% | 210 | 215 | 180 | 150 |
| 300% | 290 | 320 | 260 | 225 |
| 400% | 430 | 475 | 385 | 355 |
| 500% | 750 | 750 | 625 | 550 |
| 600% | 1,370 | 1,250 | 1,005 | 850 |
| 700% | 2,125 | 1,900 | 1,550 | 1,270 |
| Tensile strength, lbs./in.$^2$ | 2,445 | 2,650 | 2,710 | 2,415 |
| Percent elongation | 755 | 810 | 890 | 910 |
| $\eta f \times 10^{-6}$, poises × c.p.s. | 3.98 | 2.71 | 2.05 | 1.96 |
| $K \times 10^{-7}$, dynes/cm.$^2$ | 9.12 | 7.05 | 5.65 | 5.73 |
| Percent relative damping | 29.7 | 26.6 | 25.3 | 24.1 |

HEAT TREATED

| Test No | 5 | 6 | 7 | 8 |
|---|---|---|---|---|
| Weight percent vinyltrichlorosilane | 0 | 3 | 6 | 10 |
| Modulus at, lbs./in.$^2$: | | | | |
| 100% | 135 | 175 | 175 | 175 |
| 200% | 210 | 350 | 350 | 365 |
| 300% | 310 | 650 | 675 | 705 |
| 400% | 470 | 1,100 | 1,170 | 1,225 |
| 500% | 800 | 1,750 | 1,835 | 1,850 |
| 600% | 1,500 | 2,525 | 2,590 | 2,600 |
| 700% | 2,290 | | | |
| Tensile strength, lbs./in.$^2$ | 2,700 | 3,000 | 3,035 | 3,125 |
| Percent elongation | 785 | 680 | 675 | 658 |
| $\eta f \times 10^{-6}$, poises × c.p.s. | 2.12 | 1.72 | 1.61 | 1.58 |
| $K \times 10^{-7}$, dynes/cm.$^2$, 50° C | 6.28 | 6.24 | 6.02 | 5.85 |
| Percent relative damping, 50° C | 23.8 | 19.9 | 19.4 | 19.5 |

As shown in the upper part of Table I, the surface treatment of Hi-Sil C with vinyl trichlorosilane does not lead to increased values of modulus in conventionally mixed butyl compounds. A recent Patent 2,665,246 makes a similar statement.

Heat treatment of these systems completely changes the picture. The initial negative effect of adding vinyl trichlorosilane in unheat-treated compounds is overcome and reversed. If both compositions are thermally interacted, the 300% modulus is double when the filler is treated with 3% vinylsilane. The heat-treated vinylsilane-modified filler composition, on the other hand, has double the 300% modulus of a corresponding 3% vinylsilane-modified sample which has not been heat-treated. Heat-treatment of compositions using pigment with 6 and 10% modification leads to an optimum value of modulus of about 700 lbs./in.$^2$, tensile strengths of 3000 lbs./in.$^2$ and good low internal viscosity values of about 1.70 to 1.60 (only about 40 to 43% as high as the 3.98 value of the unheat-treated unmodified silica control compounds).

The damping properties of butyl systems with vinyl trichlorosilane modified Hi-Sil C are improved whether the compound is heat-treated or not. The negative effect on modulus which was noted for conventionally mixed systems is not found here. $\eta f$ responds to both heat treatment and pigment modification.

The above described data are set forth graphically in the accompanying drawing which is a chart showing the strength (modulus) and internal viscosity of Butyl rubber compositions containing vinyltrichlorosilane-modified silica. In this chart the 300% modulus (in pounds per square inch) is plotted against the internal viscosity expressed as $\eta f \times 10^{-6}$ (poises × c.p.s.). Any individual spot on that chart shows both values (modulus and internal viscosity) for the particular composition which the spot represents. The numerals beside the two curves indicate the percent of vinyltrichlorosilane used in modifying the silica. The two spots marked "0" represent compositions in which the Butyl rubber was compounded with ordinary standard silica not modified by any vinyl-trichlorosilane.

The area in the upper left corner of the chart represents highest modulus and lowest internal viscosity, and therefore, represents the best combination of these two properties. Conversely, the area in the lower right corner of the chart represents the lowest modulus values and the highest internal viscosity, and therefore, indicates the poorest combination of these two properties.

Referring specifically to the "controls" dotted curve, it is noted that the composition marked "0" representing Butyl rubber compounded with standard Hi-Sil with no vinyltrichlorosilane treatment has the poorest combination of the samples represented on the chart, namely, a modulus slightly under 300 and an internal viscosity of about 4.0. With 3% modification of the silica with vinyltrichlorosilane the internal viscosity is greatly improved (from 4.0 down to 2.7), but the modulus has not been appreciably improved; and with greater percentages of vinyltrichlorosilane modification, i.e., 6% and 10%, the internal viscosity is further improved but the modulus is actually impaired down to values in the range of 220 to 260.

On the other hand, the "heat-treated" solid curve shows that although heat-treatment without silica modification produces some beneficial lowering of the internal viscosity, but no improvement in modulus, the combination of heat-treatment and modification of the silica with 3, 6 and 10% of vinyltrichlorosilane produces the extremely surprising combination of very high modulus (from 650 to 700), and an internal viscosity of about 1.6 to 1.7 which is even better than the 2.0 or 2.1 obtained with the unheat-treated modified silica control compositions or the heat-treated unmodified silica composition.

It is known that halosilanes condense with water to form polymeric siloxanes.

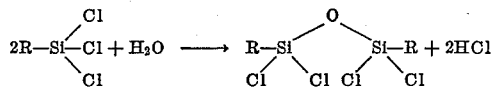

Hi-Sil C is a hydrated silicon dioxide, and it is believed that the halosilanes are attached to the particle surface thereof through a unimolecular condensation at the hydroxyl groupings.

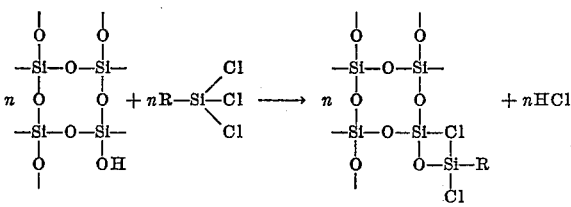

The mere attachment of the silane does not render the pigment reactive. Reactivity, i.e., responsiveness to heat treatment, results only if there is also unsaturation in the attached silane, and presumably this unsaturation is the point at which bonds can be formed with the polymer. Hi-Sil C is treated with ethyl trichlorosilane, there is an initial attachment of silane and pigment but, again, there is no heat treatment response, because there is no point of reactivity at which bonds between polymer and the filler can be formed. The vulcanization of conventionally mixed Butyl with ethyl trichlorosilane treated Hi-Sil C is very sharply retarded (obtaining a 300% modulus of only 175, compared to 330 with standard, unmodified Hi-Sil C). This is thought to be the result of the HCl which is liberated in the condensation joining silane and filler. Heat treatment of the system containing pigment modified with ethyl trichlorosilane eliminates the cure retardation effect, and gives a 300% modulus of 300 probably because the HCl is driven off during the hot milling; but these values are far short of the 650–700 modulus values obtained in Example I by heat-treatment of a Butyl rubber mixed with a vinyltrichlorosilane-treated Hi-Sil C.

It is not intended that this invention be limited to the specific modifications or examples which have been given merely for the sake of illustration, but only by the appended claims in which it is intended to claim all novelty inherent in the invention of modifications coming within the scope and spirit of the invention.

What is claimed is:

1. The method of making improved filler-compounded Butyl rubber compositions which comprises reacting mineral filler with an alkenylhalosilane, mixing the resulting modified filter with a Butyl rubber copolymer containing about 0.1 to 15.0 weight percent of a $C_4$ to $C_{14}$ multiolefin and about 85 to 99.9 weight percent of a $C_4$ to $C_8$ mono-olefin, and heating the resulting compositions to a temperature of about 250 to 450° F. in the absence of curing amounts of vulcanizing agents, and masticating the heated composition.

2. The method of making improved mineral filler-compounded Butyl rubber compositions which comprises reacting a hydrated mineral filler with about 1 to 15% by weight of an alkenylhalosilane having the general formula $$R_mSi_nX_{2n+2-m}$$

in which R is an alkenyl radical, X is halogen, $m=1$ to $2n+1$, and $n=1$ to 5, mixing about 1 to 150 parts of the resulting modified filler with 100 parts by weight of a Butyl rubber copolymer containing about 0.1 to 15 weight percent of isoprene and about 85 to 99.9 weight percent of isobutylene, subjecting the resulting filler-Butyl rubber mixture to heat-treatment at a temperature of about 250 to 450° F. for a time of about 5 minutes to 8 hours, masticating the resulting mixture thoroughly, cooling it to below about 250° F., adding curing agents, shaping into the desired shape and vulcanizing the mixture into permanent shape.

3. The process of mixing improved silica-Butyl rubber compositions which comprises reacting a finely divided hydrated silica with about 2 to 10% by weight of vinyltrichlorosilane, mixing about 10 to 100 parts by weight of the resulting vinylchlorosilane-modified silica with 100 parts by weight of Butyl rubber comprising a copolymer of about 85 to 99.9% of isobutylene and about 0.1 to 15.0% of isoprene, subjecting the resulting silica-Butyl rubber mixture to heat-treatment at a temperature of about 250 to 450° F. for a time of about 5 minutes to 8 hours, masticating the resulting mixture thoroughly, cooling it to below about 250° F., adding curing agents, shaping into the desired shape and vulcanizing the mixture into permanent shape.

4. Process according to claim 3 in which heat-treatment is carried out by dynamic heating, and the time of heating is about 5 to 30 minutes.

5. Process according to claim 3 in which the heat-treatment is carried out by static heating, and the time of heating is about 1 to 8 hours.

6. Process according to claim 3 in which a heat-interaction promoter is used during the heat-treatment.

7. Process according to claim 6 using a paraquinonedioxime compound as heat-interaction promoter.

8. Composition comprising a heat-interacted mixture of about 100 parts by weight of a Butyl rubber copolymer containing about 0.1 to 15.0 weight percent of a $C_4$ to $C_{14}$ multiolefin and about 85 to 99.9 weight percent of a $C_4$ to $C_8$ isoolefin and about 10 to 100 parts by weight of an alkenylhalosilane-modified hydrated mineral filler containing about 0.1 to 15% of a combined alkenylhalosilane compound as defined in claim 2.

9. Composition comprising a heat-interacted mixture of 100 parts by weight of a Butyl rubber copolymer containing about 0.1 to 15 weight percent of isoprene and about 85 to 99.9 weight percent of isobutylene and 1 to 150 parts by weight of vinyltrichlorosilane-modified hydrated mineral filler, said composition having a substantial proportion of silica-Butyl bonds as a result of the heat interaction.

10. Composition comprising a heat-interacted mixture of 100 parts by weight of Butyl rubber comprising 95–99% of isobutylene and 1 to 5% of isoprene, with about 10 to 100 parts by weight of a finely divided modified hydrated silica modified with about 2 to 10% by weight of vinyltrichlorosilane, based on the weight of the silica, said composition having been subjected to heat-treatment at 250°–450° F. for a time of 5 minutes to 8 hours, said composition having a substantial proportion of silica-Butyl bonds as a result of said heat-interaction, said composition having been subsequently cooled, mixed with curing agents, shaped and vulcanized into permanent shape.

11. Composition according to claim 10 having a 300% modulus of at least 500 p.s.i.

12. Composition according to claim 10 having a 300% modulus of at least 600 p.s.i. and having an internal viscosity ($\eta f \times 10^{-6}$) of less than 2.0 poises$\times$c.p.s.

13. Composition according to claim 10 having been subjected to heat-treatment at about 310° F. for about 30 minutes.

14. The method of making improved mineral filler-compound Butyl rubber compositions which comprises reacting a hydrated mineral filler with about 1 to 15% by weight of an alkenylhalosilane, mixing about 1 to 150 parts by weight of the resulting modified filler with 100 parts by weight of a Butyl rubber copolymer containing about 0.1 to 15 weight percent of isoprene and about 85 to 99.9 weight percent of isobutylene, subjecting the resulting filler-Butyl rubber mixture to a heat treatment at a temperature of about 250 to 450° F. from about 5 min. to 8 hrs., masticating the resulting mixture, cooling it below about 250° F., adding a sulfur-containing compound and vulcanizing the mixture.

References Cited in the file of this patent

UNITED STATES PATENTS

| | | |
|---|---|---|
| 2,665,264 | Brooks et al. | Jan. 5, 1954 |
| 2,702,286 | Iknayan et al. | Feb. 15, 1955 |

OTHER REFERENCES

Gessler et al.: "The Reinforcement of Butyl and Other Synthetic Rubbers With Silica Pigments," Rubber Age, October 1955, pages 73–76.